US010866573B2

(12) United States Patent
Takahara

(10) Patent No.: US 10,866,573 B2
(45) Date of Patent: Dec. 15, 2020

(54) CUTTING FLUID SUPPLY TIMING CONTROL DEVICE AND MACHINE LEARNING DEVICE

(71) Applicant: FANUC CORPORATION, Yamanashi (JP)

(72) Inventor: Tetsushi Takahara, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 217 days.

(21) Appl. No.: 16/190,708

(22) Filed: Nov. 14, 2018

(65) Prior Publication Data

US 2019/0163158 A1 May 30, 2019

(30) Foreign Application Priority Data

Nov. 24, 2017 (JP) ................................ 2017-225324

(51) Int. Cl.
*G05B 19/18* (2006.01)
*G05B 13/02* (2006.01)

(52) U.S. Cl.
CPC ....... *G05B 19/182* (2013.01); *G05B 13/0265* (2013.01); *G05B 2219/37336* (2013.01)

(58) Field of Classification Search
CPC ....................................................... G06F 30/00
USPC ..................................................... 706/15, 45
See application file for complete search history.

(56) References Cited

U.S. PATENT DOCUMENTS

2004/0132383 A1* 7/2004 Langford ................ B24C 1/045 451/38
2005/0280994 A1 12/2005 Yazawa
2016/0184946 A1* 6/2016 Morimura ............... B23B 27/10 137/572
2017/0090428 A1 3/2017 Oohara
2017/0316323 A1* 11/2017 Nakanishi ............... G06F 30/20
2018/0113436 A1* 4/2018 Shimizu ............... G05B 19/408
2018/0373233 A1* 12/2018 Goto .................. G05B 23/0229

FOREIGN PATENT DOCUMENTS

JP 2003-068680 A 3/2003
JP 2005175398 A 6/2005
JP 2017068563 A 4/2017
WO 2017090098 A1 6/2017

OTHER PUBLICATIONS

Notice of Reasons for Refusal for Japanese Application No. 2017-225324, dated Sep. 3, 2019, with translation, 6 pages.

* cited by examiner

*Primary Examiner* — David R Vincent
(74) *Attorney, Agent, or Firm* — RatnerPrestia

(57) ABSTRACT

A machine learning device included in a cutting fluid supply timing control device observes operating state data regarding an operating state of a cutting fluid supply device as a state variable representing a current environment state, acquires supply timing data indicating a timing of supplying a cutting fluid as label data, and then learns the operating state data and the supply timing data in association with each other by using these state variable and label data.

6 Claims, 5 Drawing Sheets

CUTTING FLUID SUPPLY TIMING CONTROL DEVICE AND MACHINE LEARNING DEVICE

CROSS-REFERENCE TO RELATED APPLICATION

This application is a new U.S. Patent Application that claims benefit of Japanese Patent Application No. 2017-225324, filed Nov. 24, 2017 for all purposes.

BACKGROUND OF THE INVENTION

1. Field of the Invention

The present invention relates to cutting fluid supply timing control devices and machine learning devices and, in particular, to a cutting fluid supply timing control device and a machine learning device for controlling a timing of supplying a cutting fluid by look-ahead of block processing.

2. Description of the Related Art

In a cutting work, it is required to appropriately supply a cutting fluid to a cutting point to perform stable cutting. However, when an electric motor or solenoid valve which supplies the cutting fluid is away from the cutting point, a delay occurs from a time when a cutting fluid supply instruction in a work program is provided until a time when the cutting fluid is actually discharged and supplied to the cutting point, and the work may start without application of the cutting fluid.

To prevent this problem, a method is taken in which mainly a cutting fluid supply instruction in a program is provided sufficiently before the start of cutting or the cutting fluid is always supplied. Also, as a prior art technique to mitigate a delay of supplying the cutting fluid, for example, Japanese Patent Application Laid-Open No. 2003-068680 discloses a technique of solving a delay in injecting a working liquid by providing a check valve near an injection nozzle for the working liquid.

However, in the method of providing an instruction sufficiently before the start of cutting or always supplying the cutting fluid, the cutting fluid is supplied before the work actually starts, thereby not only wasting the cutting fluid but also increasing the operating time of a pump which supplies the cutting fluid and also wasting electric power. Moreover, while it is possible to solve a delay in injecting the working fluid to some degree by the technique disclosed in Japanese Patent Application Laid-Open No. 2003-068680, a check valve is required to be provided to all machines which supply the cutting fluid. Still further, maintenance is required for the check valve as a physical structure, which disadvantageously increases cost.

SUMMARY OF THE INVENTION

An object of the present invention is to provide a cutting fluid supply timing control device and a machine learning device capable of supplying a cutting fluid in accordance with a work timing without wasting the cutting fluid, electric power, and so forth.

By reading blocks of a work program in advance, the cutting fluid supply timing control device of the present invention provides a function of calculating an instruction time for cutting fluid supply and starting cutting fluid supply control prior to execution of the instruction so that the cutting fluid is supplied to a cutting point at the instruction time. A delay time in supplying the cutting fluid to the cutting point is given by manual setting via a visual check by an operator, a flow rate sensor set near a discharge port for the cutting fluid, the load of an electric motor which supplies the cutting fluid (the load increases as a route is filled with the cutting fluid), automatic setting by a vision camera or the like, or a combination thereof. For automatic setting of the timing of supplying the cutting fluid, machine learning is used.

A cutting fluid supply timing control device according to one aspect of the present invention estimates a timing of supplying a cutting fluid by a cutting fluid supply device which supplies the cutting fluid to a work position. The cutting fluid supply timing control device includes a machine learning device which learns estimation of the timing of supplying the cutting fluid with respect to an operating state of the cutting fluid supply device. The machine learning device includes a state observation unit which observes operating state data regarding the operating state of the cutting fluid supply device as a state variable representing a current environment state, a label data acquisition unit which acquires supply timing data indicating the timing of supplying the cutting fluid as label data, and a learning unit which learns the operating state data and the supply timing data in association with each other by using the state variable and the label data.

The learning unit can include an error calculation unit which calculates an error between a correlation model for estimating the timing of supplying the cutting fluid from the state variable and a correlation feature identified from teacher data prepared in advance, and a model updating unit which updates the correlation model so as to reduce the error.

The learning unit can compute the state variable and the label data in a multilayered structure.

The cutting fluid supply timing control device can further include an estimation result output unit which outputs an estimation result of the timing of supplying the cutting fluid based on the learning result by the learning unit.

The machine learning device can be present in a cloud server.

A machine learning device according to one aspect of the present invention learns estimation of a timing of supplying a cutting fluid with respect to an operating state of a cutting fluid supply device which supplies the cutting fluid to a work position. The machine learning device includes a state observation unit which observes operating state data regarding the operating state of the cutting fluid supply device as a state variable representing a current environment state, a label data acquisition unit which acquires supply timing data indicating the timing of supplying the cutting fluid as label data, and a learning unit which learns the operating state data and the supply timing data in association with each other by using the state variable and the label data.

According to the present invention, it is not required to generate a program in consideration of a delay in discharge of the cutting fluid, and a stable work can be achieved. Also, by stopping the electric motor as appropriate, power consumption can be reduced. Also at the time of stopping supply of the cutting fluid, similar control is applied to allow reduction in power consumption.

DETAILED DESCRIPTION OF THE PREFERRED EMBODIMENT

Figure 1:
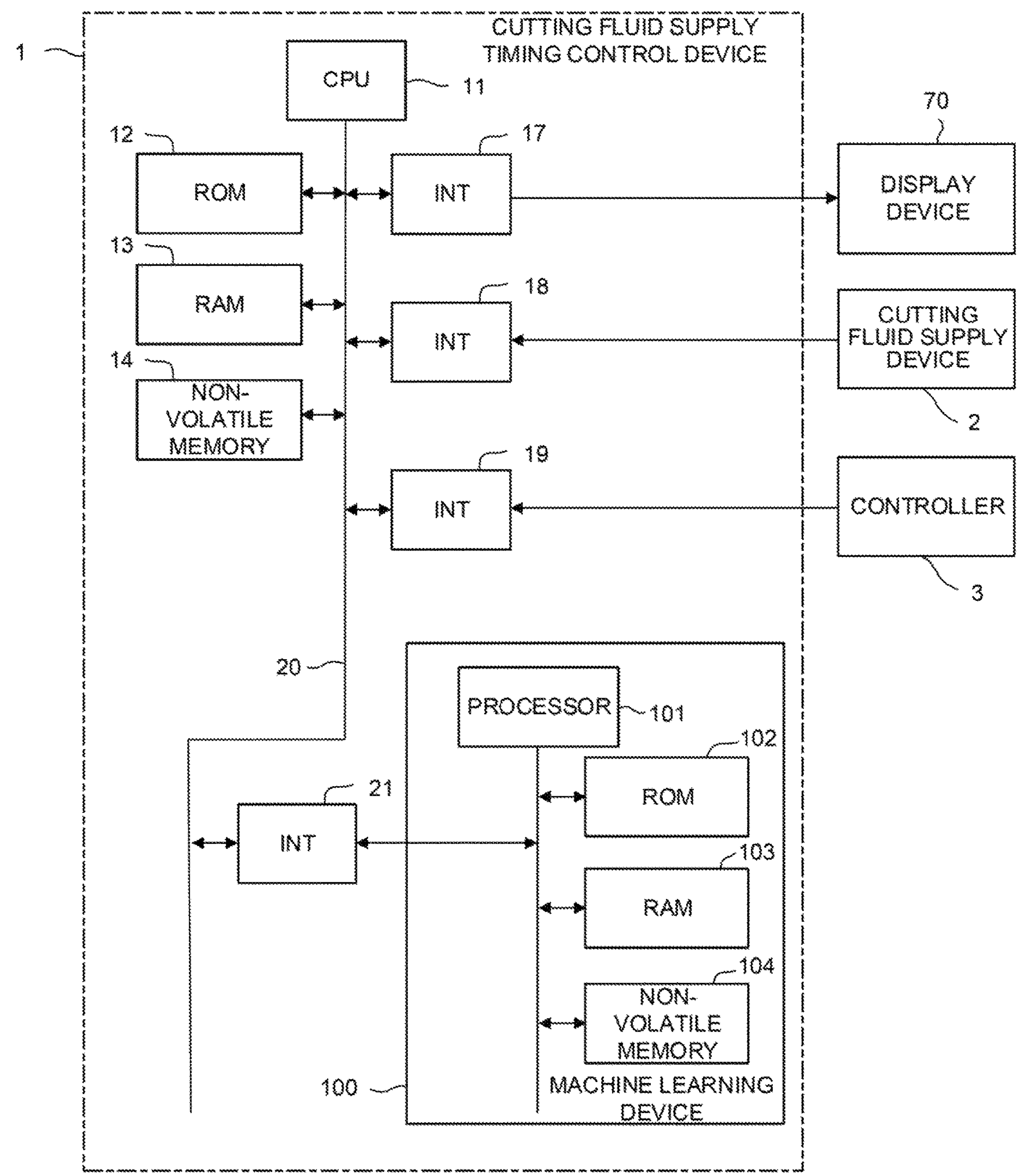
FIG. 1 is a schematic diagram of hardware structure of a cutting fluid supply timing control device according to one embodiment.

FIG. 1 is a schematic diagram of hardware structure of main parts of a cutting fluid supply timing control device according to one embodiment.

A cutting fluid supply timing control device 1 can be implemented as, for example, a controller which controls a manufacturing machine. Also, the cutting fluid supply timing control device 1 can be implemented as a computer provided together with a controller which controls a manufacturing machine, a cell computer connected via a network to a controller which controls a manufacturing machine, a host computer, a cloud server, or the like. FIG. 1 depicts an example in which the cutting fluid supply timing control device 1 is implemented as a computer provided together with a controller which controls a manufacturing machine.

A CPU 11 included in the cutting fluid supply timing control device 1 according to the present embodiment is a processor which performs overall control of the cutting fluid supply timing control device 1. The CPU 11 reads a system program stored in a ROM 12 via a bus 20, and controls the entire cutting fluid supply timing control device 1 by following the system program. In a RAM 13, temporary calculation data and display data, various data inputted by an operator via an input unit not depicted, and so forth are temporarily stored.

A non-volatile memory 14 is configured as a memory in which a storage state is retained by, for example, being backed up by a battery not depicted, even if the cutting fluid supply timing control device 1 is powered off. In this non-volatile memory 14, various data acquired from a controller 3 which controls a manufacturing machine, a cutting fluid supply device 2 as its peripheral device, and a robot not depicted are stored (for example, a work program acquired from the controller 3 via an interface 19 and currently being executed in the controller 3, a detection value by a sensor attached to the manufacturing machine, the operating state of the cutting fluid supply device 2 and the amount of a cutting fluid in a tank acquired via an interface 18, a pump pressure, and images captured from a camera attached to the robot not depicted). These various data stored in the non-volatile memory 14 may be developed onto the RAM 13 for use. Also, in the ROM 12, various system programs required for operation of the cutting fluid supply timing control device 1 are written in advance (including a system program for controlling exchanges with a machine learning device 100).

A display device 70 is a device for displaying text and graphics indicating states of the cutting fluid supply timing control device 1, the cutting fluid supply device 2, and so forth outputted via an interface 17, and a liquid-crystal display or the like can be used.

An interface 21 is an interface for connecting the cutting fluid supply timing control device 1 and the machine learning device 100. The machine learning device 100 includes a processor 101 which controls the entire machine learning device 100, a ROM 102 having a system program and so forth stored therein, a RAM 103 for temporary storage in each process regarding machine learning, and a non-volatile memory 104 for use in storage of a learning model and so forth. The machine learning device 100 can observe each piece of information that can be acquired by the cutting fluid supply timing control device 1 via the interface 21 (for example, a block of a work program to be executed in the controller 3, a detection value by a sensor attached to the manufacturing machine, the operating state of the cutting fluid supply device 2, the amount of the cutting fluid in the tank, a pump pressure, and images captured from the camera attached to the robot). Also, the cutting fluid supply timing control device 1 controls the timing of supplying the cutting fluid and so forth based on a value outputted from the machine learning device 100.

Figure 2:
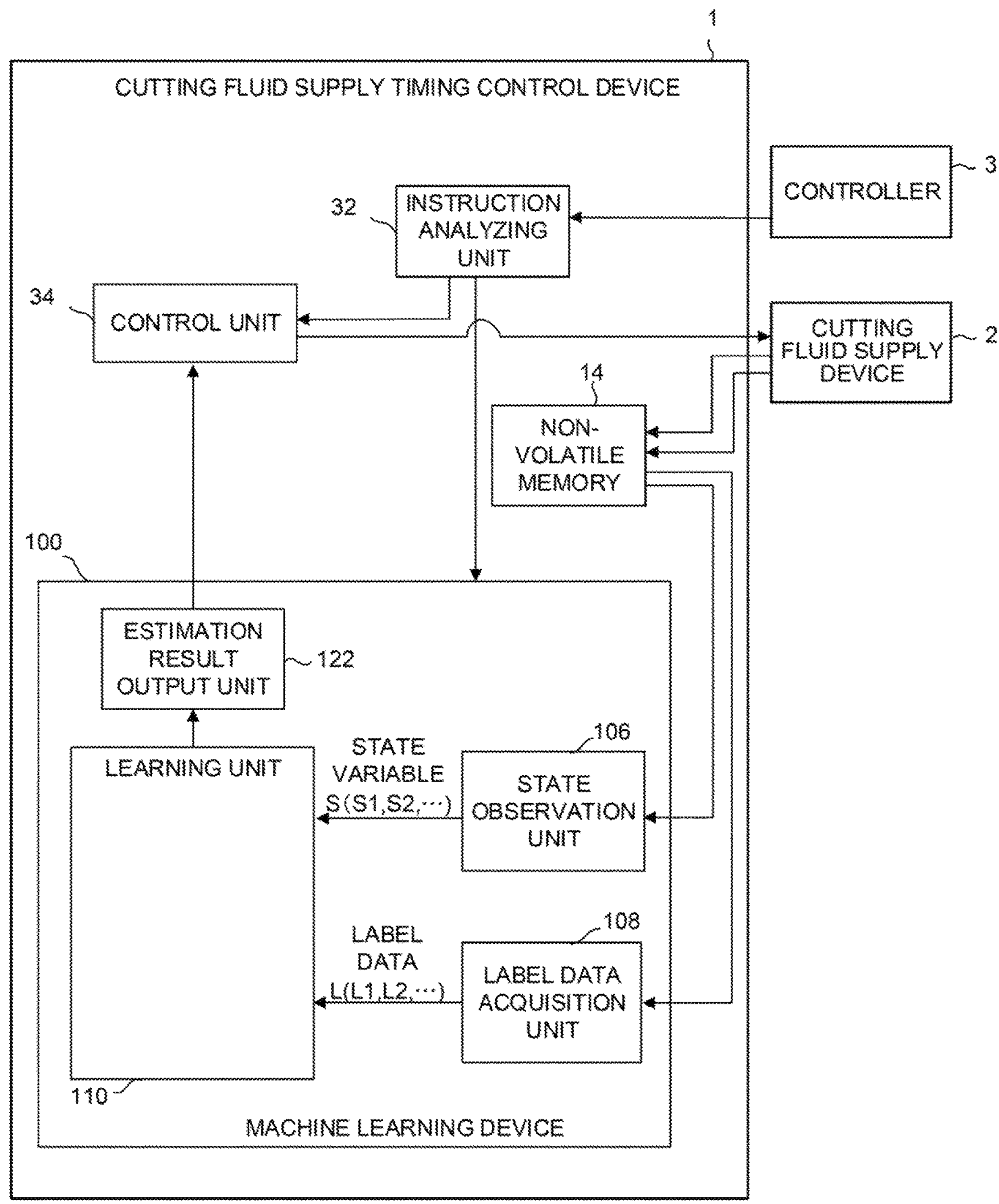
FIG. 2 is a schematic functional block diagram of the cutting fluid supply timing control device according to one embodiment.

FIG. 2 is a schematic functional block diagram of the cutting fluid supply timing control device 1 and the machine learning device 100 according to the present embodiment.

Each functional block depicted in FIG. 2 is achieved by the CPU 11 included in the cutting fluid supply timing control device 1 and the processor 101 of the machine learning device 100 depicted in FIG. 1 each executing its system program and controlling the operation of each unit of the cutting fluid supply timing control device 1 and the machine learning device 100.

The cutting fluid supply timing control device 1 includes an instruction analyzing unit 32 which reads blocks of the work program acquired from the controller 3 to generate data for control by a control unit 34 described below, and the control unit 34 which controls the manufacturing machine and its peripheral device, that is, the cutting fluid supply device 2, based on the data for control outputted from the instruction analyzing unit 32 and the result of estimation of the timing of supplying the cutting fluid outputted from the machine learning device 100.

The instruction analyzing unit 32 analyzes blocks of the work program acquired from the controller 3 to generate data for control for use by the control unit 34 in controlling the manufacturing machine. Also, when reading blocks of the work program acquired from the controller 3 in advance of execution by the controller 3 and finding a cutting fluid supply instruction (for example, M08 of M code), the instruction analyzing unit 32 instructs the machine learning device 100 to estimate a timing of supplying the cutting fluid (timing of operating a pump) by the cutting fluid supply instruction.

Meanwhile, the machine learning device 100 included in the cutting fluid supply timing control device 1 includes software (such as a learning algorithm) and hardware (such as the processor 101) for learning for itself, by so-called machine learning, estimation of the timing of supplying the cutting fluid with respect to the operating state of the cutting fluid supply device 2. What is learned by the machine learning device 100 included in the cutting fluid supply timing control device 1 corresponds to a model structure representing a correlation between the operating state of the cutting fluid supply device 2 and the timing of supplying the cutting fluid.

As depicted by the functional blocks of FIG. 2, the machine learning device 100 included in the cutting fluid supply timing control device 1 includes a state observation unit 106, a label data acquisition unit 108, a learning unit 110, and an estimation result output unit 122. The state observation unit 106 observes operating state data S1 indicating an operating state of the cutting fluid supply device 2 as a state variable S representing a current environment state. The label data acquisition unit 108 acquires label data L including supply timing data L1 indicating a timing of supplying the cutting fluid. The learning unit 110 learns the operating state of the cutting fluid supply device 2 in association with the timing of supplying the cutting fluid by using the state variable S and the label data L. The estimation result output unit 122 outputs the timing of supplying the cutting fluid estimated from the operating state of the cutting fluid supply device 2 by using a model learned by the learning unit 110.

The state observation unit 106 acquires the operating state data S1 as the state variable S from the non-volatile memory 14 at the time of learning by the learning unit 110. Also, at the time of estimation of the timing of supplying the cutting fluid by using the learning result of the learning unit 110, the state observation unit 106 acquires the operating state data S1 as the state variable S from the cutting fluid supply device 2 (needless to say, this acquisition may be made via the non-volatile memory 14).

Of state variables S to be observed by the state observation unit 106, the operating state data S1 can be acquired as, for example, a set of data regarding a situation of supplying the cutting fluid by the cutting fluid supply device 2. The data regarding the situation of supplying the cutting fluid by the cutting fluid supply device 2 includes, for example, a time elapsed after the previous supply of the cutting fluid is stopped (a time when the pump is turned off or a valve is closed) and a pump pressure at the time of the previous supply of the cutting fluid. As this operating state data S1, any of various data related to supply of the cutting fluid by the cutting fluid supply device 2 can be used in accordance with the operating environment of each cutting fluid supply device 2. The data regarding each operating state included in the operating state data S1 may be, for example, a single numerical value or a series of values acquired by sampling, in a predetermined cycle, values varying in a predetermined period.

At the time of learning by the learning unit 110, the label data acquisition unit 108 calculates, as the label data L, the supply timing data L1 regarding the timing of supplying the cutting fluid, based on the data stored in the non-volatile memory 14. The supply timing data L1 is calculated based on, for example, a period of time from a time when the control unit 34 instructs the cutting fluid supply device 2 to supply the cutting fluid to a time when the cutting fluid is actually discharged from a nozzle or the like to be supplied to a work position. As for the time when the control unit 34 instructs the cutting fluid supply device 2 to supply the cutting fluid, a timing of outputting the instruction by the control unit 34 is stored in the non-volatile memory 14 as appropriate. Also, as for the time when the cutting fluid is actually discharged from the nozzle or the like to be supplied to the work position, any of the following times can be used, for example, a time measured manually by an operator via a visual check and set via an input device not depicted, a time when the discharge is detected by a flow rate sensor set near a discharge port for the cutting fluid, a time of discharge estimated from the load on an electric motor which supplies the cutting fluid (as a route is filled with the cutting fluid, the load of the pump increases to be stabilized with discharge, and therefore that moment can be estimated as a discharge time), and a time when discharge of the cutting fluid is observed by a camera or the like attached to the robot. The label data acquisition unit 108 is used at the time of learning by the learning unit 110 and, after learning by the learning unit 110 is completed, is not required to be an indispensable component for the machine learning device 100.

The learning unit 110 learns the label data L (supply timing data L1 indicating the timing of supplying the cutting fluid) with respect to the state variable S (operating state data S1 indicating the operating state of the cutting fluid supply device 2) by following any of learning algorithms collectively referred to as machine learning. The learning unit 110 can learn, for example, a correlation between the operating state data S1 included in the state variables S and the supply timing data L1 included in the label data L. The learning unit 110 can repeatedly perform learning based on a data set including the state variables S and the label data L.

In learning by the learning unit 110, a learning cycle is desirably performed a plurality of times based on the data acquired for each of a plurality of cutting fluid supply devices 2. By repeating this learning cycle, the learning unit 110 automatically interprets the correlation between the operating state of the cutting fluid supply device 2 (operating state data S1) and the timing of supplying the cutting fluid (supply timing data L1). At the start of the learning algorithm, the correlation of the supply timing data L1 with respect to the operating state data S1 is substantially unknown. However, as the learning unit 110 proceeds to perform learning, the relation of the supply timing data L1 with respect to the operating state data S1 is gradually interpreted, and the learned model acquired as a result is used, thereby allowing the correlation of the supply timing data L1 with respect to the operating state data S1 to be interpreted.

Based on the result of learning by the learning unit 110 (learned model), the estimation result output unit 122 estimates a timing of supplying the cutting fluid based on the operating state of the cutting fluid supply device 2, and outputs the estimated timing of supplying the cutting fluid. More specifically, the supply timing data L1 regarding the timing of supplying the cutting fluid learned by the learning unit 110 in association with the operating state data S1 indicating the operating state of the cutting fluid supply device 2 indicates a time period from a time when the control unit 34 instructs the cutting fluid supply device 2 to supply the cutting fluid to a time when the cutting fluid is actually supplied to the work position, and this value is outputted in estimation using the model learned by the learning unit 110. Then, based on this outputted value, the estimation result output unit 122 estimates a time when an instruction for starting supply of the cutting fluid is outputted to the cutting fluid supply device 2 before a time when the block of the cutting fluid supply instruction (M08) in the work program is executed, and outputs the estimation result to the control unit 34.

As a modification example of the machine learning device 100, included in the cutting fluid supply timing control device 1 of a conveyer, the state observation unit 106 may observe, in addition to the operating state data S1, cutting fluid state data S2 indicating the state of the cutting fluid to be supplied by the cutting fluid supply device 2 as one of the state variables S. This cutting fluid state data S2 includes, for example, the amount of the cutting fluid left in a tank of the cutting fluid (when the cutting fluid runs short, air is entrained in the cutting fluid to be supplied, thereby possibly degrading supply delay) and the quality of the cutting fluid (fluid quality of the cutting fluid changes with seasonal factors, deterioration with time, and so forth).

According to the above-described modification example, the machine learning device 100 can learn the supply timing data L1 in association with the operating state data S1 and the cutting fluid state data S2. Therefore, accurate estimation can be performed with respect to a change in the timing of supplying the cutting fluid due to a change of state of the cutting fluid.

Figure 3:
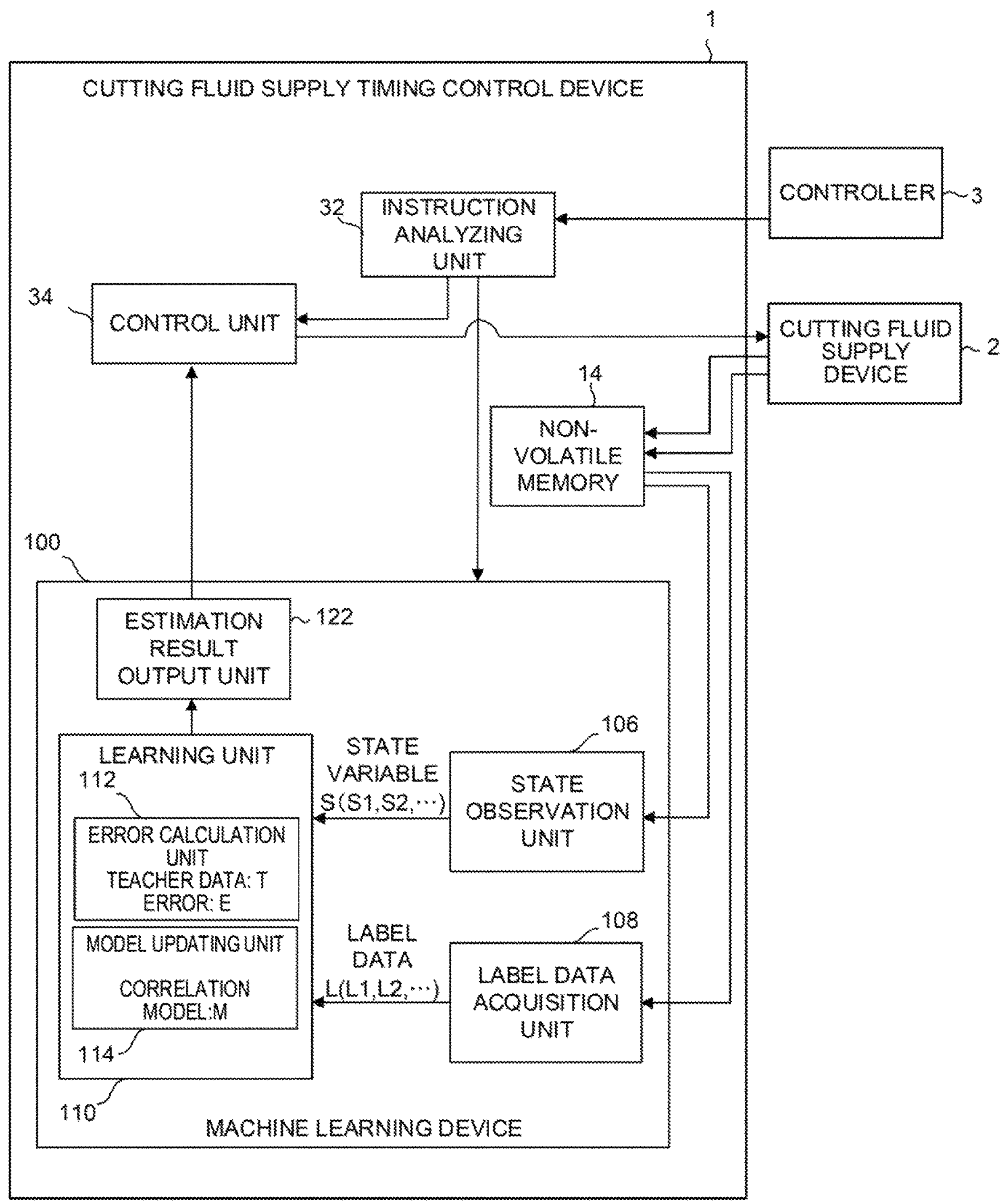
FIG. 3 is a schematic functional block diagram of one mode of the cutting fluid supply timing control device.

In the above-structured machine learning device 100, the learning algorithm to be executed by the learning unit 110 is not particularly limited, and any learning algorithm known as machine learning can be adopted. FIG. 3 depicts a mode of structure different from that of the cutting fluid supply timing control device 1 depicted in FIG. 2, including a learning unit 110 which performs supervised learning as an example of the learning algorithm. Supervised learning is a technique of learning a correlation model for estimating a necessary output for a new input by being provided with known data sets of inputs and their corresponding outputs (which are referred to as teacher data) and identifying features implying a correlation between an input and an output from teacher data.

In the machine learning device 100 included in the cutting fluid supply timing control device 1 depicted in FIG. 3, the learning unit 110 includes an error calculation unit 112 and a model updating unit 114. The error calculation unit 112 calculates an error E between a correlation model M which estimates the timing of supplying the cutting fluid from the operating state of the cutting fluid supply device 2 and a correlation feature which is identified from teacher data T acquired from the previously-acquired data of the operating state of the cutting fluid supply device 2 and the result of the actual timing of supplying the cutting fluid. The model updating unit 114 updates the correlation model M so as to reduce the error E. With the model updating unit 114 repeating update of the correlation model M, the learning unit 110 learns estimation of the timing of supplying the cutting fluid from the operating state of the cutting fluid supply device 2.

An initial value of the correlation model M represents, for example, a correlation between the state variable S and the label data L in a simplified manner (for example, by a linear function), and is provided to the learning unit 110 before the start of supervised learning. As described above, in the present invention, the teacher data T can be configured by using the previously-acquired data of the operating state of the cutting fluid supply device 2 and data of the actual timing of supplying the cutting fluid, and is provided as appropriate to the learning unit 110 at the time of operation of the cutting fluid supply timing control device 1. The error calculation unit 112 identifies a correlation feature which implies a correlation between the operating state of the cutting fluid supply device 2 and the timing of supplying the cutting fluid from the teacher data T provided as appropriate to the learning unit 110, and finds the error E between this correlation feature and the correlation model M corresponding to the state variable S and the label data L in the current state. The model updating unit 114 updates the correlation model M so as to reduce the error E by following, for example, a predetermined update rule.

In the next learning cycle, the error calculation unit 112 estimates the timing of supplying the cutting fluid by using the state variable S by following the correlation model M after the update and finds the error E between the result of the estimation and the actually-acquired label data L, and the model updating unit 114 updates the correlation model M again. In this manner, a previously-unknown correlation between the current environment state and its estimation becomes gradually apparent.

Figure 4A:
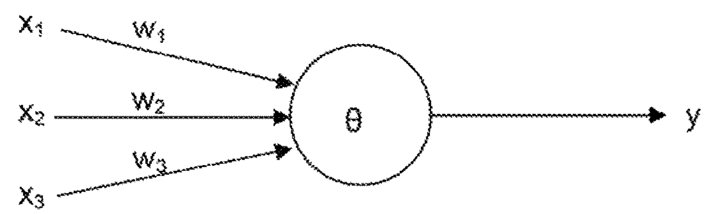
FIG. 4A is a diagram explaining a neuron.
Figure 4B:
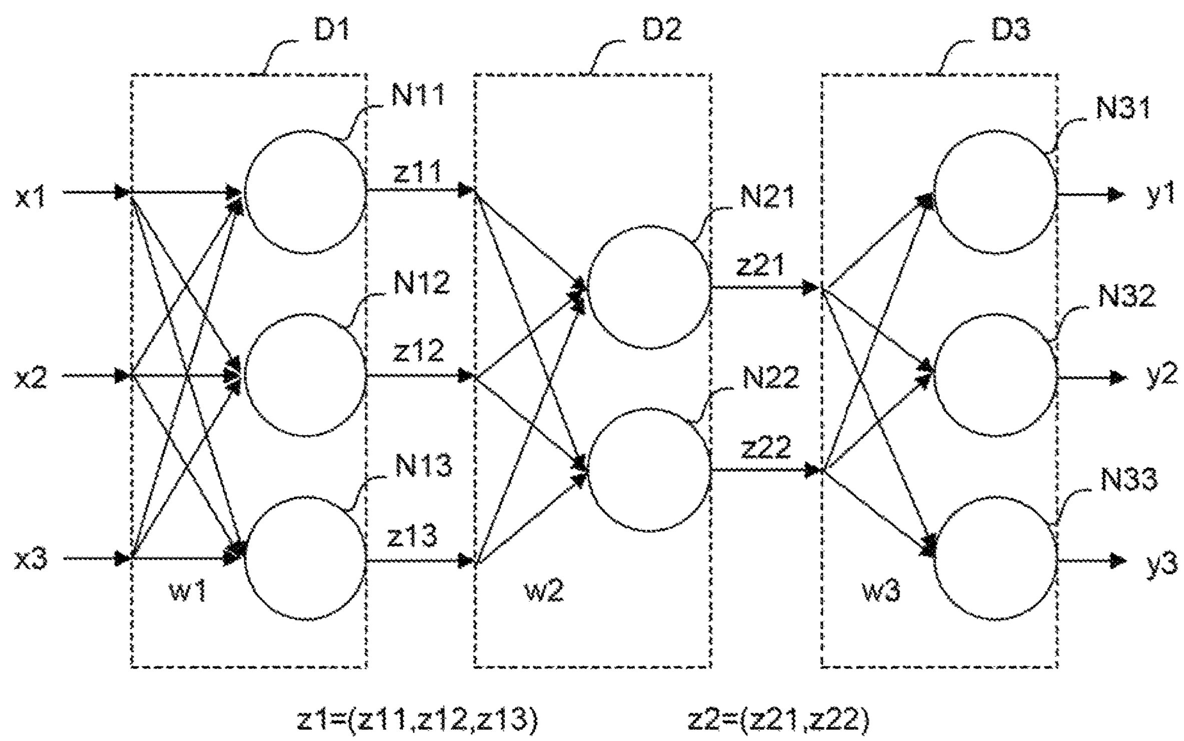
FIG. 4B is a diagram explaining a neural network.

When the above-described supervised learning is advanced, a neural network can be used. FIG. 4A schematically depicts a model of a neuron. FIG. 4B schematically depicts a model of a three-layer neural network configured by combining the neurons depicted in FIG. 4A. The neural network can be configured by, for example, a calculation device, storage, or the like which imitates the model of the neuron.

The neuron depicted in FIG. 4A outputs a result y of a plurality of inputs x (here, for example, inputs $x_1$, $x_2$, and $x_3$). The inputs $x_1$ to $x_3$ are multiplied by weights w ($w_1$ to $w_3$) corresponding to these inputs x. As a result, the neuron outputs the result y expressed by Formula 1 given below. In Formula 1, all of the inputs x, the results y, and the weights w are vectors. Moreover, θ is a bias and $f_k$ is an activating function.

$$y=f_k(\Sigma_{i=1}^{n} x_i w_i - \theta) \quad (1)$$

A plurality of inputs x (here, for example, inputs x1, x2, and x3) are input to the three-layer neural network depicted in FIG. 4B from the left side thereof, and results y (here, for example, results y1, y2, and y3) are output from the right side thereof. In an example depicted in the drawing, each of the inputs x1, x2, and x3 is multiplied by a corresponding weight (generically expressed as w1) and each of the inputs x1, x2, and x3 is input to three neurons N11, N12, and N13.

The outputs of the neurons N11 to N13 are generically expressed as z1. The output z1 can be regarded as a feature vector acquired by extracting a feature amount of the corresponding input vector. In the example depicted in FIG. 4B, each of the feature vectors z1 is multiplied by a corresponding weight (generically expressed as w2), and each of the feature vectors z1 is input to two neurons N21 and N22. The feature vector z1 indicates a feature between the weight w1 and the weight w2.

The outputs of the neurons N21 and N22 are generically expressed as z2. The output z2 can be regarded as a feature acquired by extracting a feature amount of the corresponding input vector. In the example depicted in FIG. 4B, each of the feature vectors z2 is multiplied by a corresponding weight (generically expressed as w3), and each of the feature vectors z2 is input to three neurons N31, N32, and N33. The feature vector z2 indicates a feature between the weight w2 and the weight w3. Finally, the neurons N31 to N33 respectively output the results y1 to y3.

It is also possible to use a scheme using a neural network with three or more layers, that is, so-called deep learning.

In the machine learning device 100 included in the cutting fluid supply timing control device 1, the learning unit 110 performs computation in a multilayered structure following the above-described neural network by taking the state variables S as the inputs x, and the timing of supplying the cutting fluid (results y) can thus be estimated from the values (inputs x) of the operating state of the cutting fluid supply device 2. Operation modes of the neural network include a learning mode and a value prediction mode. For example, the weights w are learned in the learning mode by using a learning data set, and value determination on behaviors can be performed in the value prediction mode by using the learned weights w. In the value prediction mode, detection, classification, inference, and so forth can also be performed.

The above-described structure of the machine learning device 100 can be written as a machine learning method (or software) with each step to be executed by the processor 101. This machine learning method is a machine learning method of learning estimation of a timing of supplying the cutting fluid from the operating state of the cutting fluid supply device 2, and includes a step in which the processor 101 observes the operating state (operating state data S1) of the cutting fluid supply device 2 as the state variable S indicating a current state, a step in which the processor 101 acquires the timing of supplying the cutting fluid (supply timing data L1) as the label data L, and a step in which the processor 101 learns the operating state data S1 and the timing of supplying the cutting fluid in association with each other by using the state variable S and the label data L.

The learned model that was learned and acquired by the learning unit 110 of the machine learning device 100 can be used as a program module, which is a part of software regarding machine learning. The learned model of the present invention can be used in a computer including a processor such as a CPU or GPU and a memory. More specifically, the processor of the computer operates so as to perform computation by following an instruction from the learned model stored in the memory, with the operating state of the cutting fluid supply device 2 taken as an input and, based on the computation result, output an estimation result of the timing of supplying the cutting fluid. The learned model of the present invention can be copied to another computer for use via an external storage medium, a network, or the like.

Also, when the learned model of the present invention is copied to another computer for use in a new environment, based on new state variables and label data acquired in that new environment, the learned model can be caused to perform further learning. In this case, a learned model derived from the learned model in the new environment (hereinafter referred to as a derived model) can be acquired. The derived model of the present invention is the same as the original learned model in that the estimation result of the timing of supplying the cutting fluid is outputted based on the operating state of the cutting fluid supply device 2, but is different therefrom in that a result more suitable for the new environment than that of the original learned model is outputted. This derived model can also be copied to another computer for use via an external storage medium, a network, or the like.

Furthermore, by using the output acquired for the input to the machine learning device having the learned model of the present invention incorporated therein, a learned model acquired by learning from scratch in another machine learning device (hereinafter referred to as a distilled model) can be generated and used (this learning process is referred to as distillation). In distillation, the original learned model is referred to as a teacher model, and a newly-generated distilled model is referred to as a student model. In general, the distilled model is smaller in size than the original learned model, but can have a degree of accuracy equivalent to that of the original learned model, and is therefore more suitable for distribution to anther computer via an external storage medium, a network, or the like.

Figure 5:
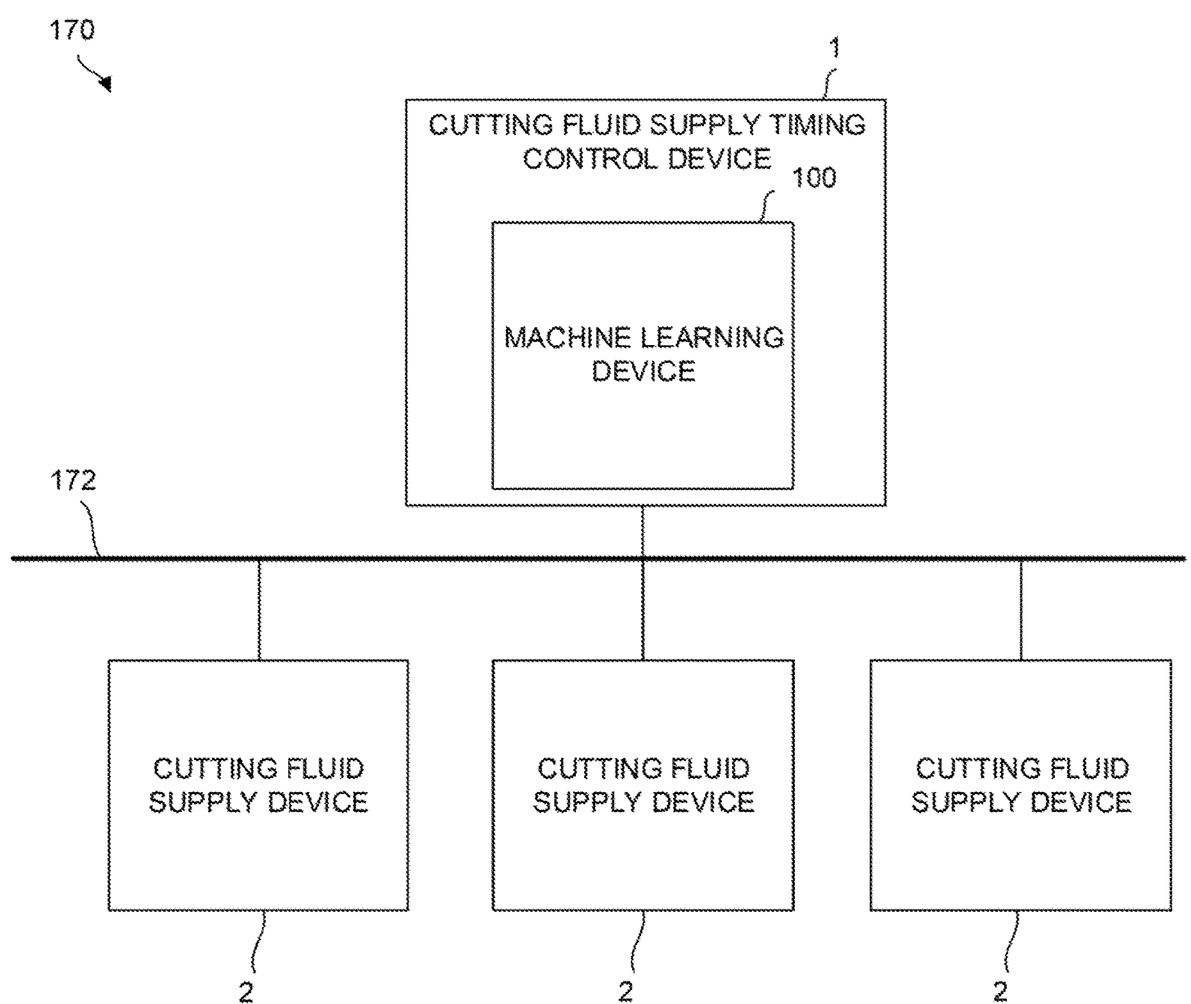
FIG. 5 is a schematic functional block diagram of one mode of a system having the cutting fluid supply timing control device incorporated therein.

FIG. 5 is a system 170 according to one embodiment that includes the cutting fluid supply timing control device 1.

The system 170 includes at least one cutting fluid supply timing control device 1 implemented as part of a computer such as a cell computer, host computer, or cloud server, (a manufacturing machine including) a plurality of cutting fluid supply devices 2, and a wired/wireless network 172 which connects the cutting fluid supply timing control device 1 and the cutting fluid supply devices 2 to one another. Although omitted in FIG. 5, controllers each of which takes its cutting fluid supply device 2 as a peripheral device are also connected to the network 172.

In the above-structured system 170, the cutting fluid supply timing control device 1 including the machine learning device 100 can automatically and accurately estimate the timing of supplying the cutting fluid with respect to the operating state of the cutting fluid supply device 2 by the learning result of the learning unit 110. Also, it can be configured that, based on the state variable S and the label data L acquired for each of the plurality of cutting fluid supply devices 2, the machine learning device 100 of the cutting fluid supply timing control device 1 learns an estimation of the timing of supplying the cutting fluid common to all of the cutting fluid supply devices 2 and the learning result can be used in all of the cutting fluid supply devices 2. Therefore, according to the system 170, with more various data sets (including the state variable S and the label data L) taken as inputs, the speed and reliability of learning of estimation of the timing of supplying the cutting fluid can be improved.

While the embodiment of the present invention have been described above, the present invention is not limited only to the examples of the embodiment described above and can be carried out in various ways by being changed or modified as appropriate.

For example, the learning algorithm and the arithmetic algorithm to be executed by the machine learning device 100, the algorithm to be executed by the cutting fluid supply timing control device 1, and so forth are not limited to those described above, and various algorithms can be adopted.

Also in the above-described embodiment, the cutting fluid supply timing control device 1 and the machine learning device 100 each have a different CPU. However, the machine learning device 100 may be achieved by the CPU 11 included in the cutting fluid supply timing control device 1 and the system program stored in the ROM 12.

The invention claimed is:

1. A cutting fluid supply timing control device which estimates a timing of supplying a cutting fluid by a cutting fluid supply device which supplies the cutting fluid to a work position, the cutting fluid supply timing control device comprising:

a machine learning device which learns estimation of the timing of supplying the cutting fluid with respect to an operating state of the cutting fluid supply device, wherein the machine learning device includes a state observation unit which observes operating state data regarding the operating state of the cutting fluid supply device as a state variable representing a current environment state, the operating state data including at least a time elapsed after the previous supply of the cutting fluid is stopped, a label data acquisition unit which acquires supply timing data indicating the timing of supplying the cutting fluid as label data, and a learning unit which learns a correlation between the operating state data and the supply timing data by using the state variable and the label data.

2. The cutting fluid supply timing control device according to claim 1, wherein the learning unit includes an error calculation unit which calculates an error between a correlation model for estimating the timing of supplying the cutting fluid from the state variable and a correlation feature identified from teacher data prepared in advance, and a model updating unit which updates the correlation model so as to reduce the error.

3. The cutting fluid supply timing control device according to claim 1, wherein the learning unit computes the state variable and the label data in a multilayered structure.

4. The cutting fluid supply timing control device according to claim 1, further comprising:

an estimation result output unit which outputs an estimation result of the timing of supplying the cutting fluid based on the learning result by the learning unit.

5. The cutting fluid supply timing control device according to claim 1, wherein the machine learning device is present in a cloud server.

6. A machine learning device which learns estimation of a timing of supplying a cutting fluid with respect to an operating state of a cutting fluid supply device which supplies the cutting fluid to a work position, the machine learning device comprising:

a state observation unit which observes operating state data regarding the operating state of the cutting fluid supply device as a state variable representing a current environment state, the operating state data including at least a time elapsed after the previous supply of the cutting fluid is stopped;

a label data acquisition unit which acquires supply timing data indicating the timing of supplying the cutting fluid as label data; and a learning unit which learns a correlation between the operating state data and the supply timing data by using the state variable and the label data.

* * * * *